(12) United States Patent
Isaacson et al.

(10) Patent No.: US 7,487,535 B1
(45) Date of Patent: Feb. 3, 2009

(54) AUTHENTICATION ON DEMAND IN A DISTRIBUTED NETWORK ENVIRONMENT

(75) Inventors: Scott A. Isaacson, Woodland Hills, UT (US); Daniel G. Fritch, Orem, UT (US); Larry Hal Henderson, Orem, UT (US); Lynn W. Crabb, Lindon, UT (US); James D. Nyland, Jr., Pleasant Grove, UT (US)

(73) Assignee: Novell, Inc., Provo, UT (US)

( * ) Notice: Subject to any disclaimer, the term of this patent is extended or adjusted under 35 U.S.C. 154(b) by 884 days.

(21) Appl. No.: 10/061,895

(22) Filed: Feb. 1, 2002

(51) Int. Cl.
*H04L 9/32* (2006.01)
*H04L 9/00* (2006.01)

(52) U.S. Cl. .................... 726/4; 726/5; 726/1; 713/183

(58) Field of Classification Search .................. 726/4, 726/5, 1, 17; 713/183, 182; 709/219, 225, 709/229
See application file for complete search history.

(56) References Cited

U.S. PATENT DOCUMENTS

| | | | | |
|---|---|---|---|---|
| 5,235,642 A * | 8/1993 | Wobber et al. | ............... | 713/156 |
| 5,608,909 A * | 3/1997 | Atkinson et al. | ............ | 719/315 |
| 5,689,638 A * | 11/1997 | Sadovsky | .................... | 726/21 |
| 5,815,665 A * | 9/1998 | Teper et al. | ................. | 709/229 |
| 5,923,756 A * | 7/1999 | Shambroom | ................ | 713/156 |
| 5,948,064 A * | 9/1999 | Bertram et al. | ............. | 709/225 |
| 6,052,724 A * | 4/2000 | Willie et al. | ................. | 709/223 |
| 6,092,194 A * | 7/2000 | Touboul | ....................... | 726/24 |
| 6,249,788 B1* | 6/2001 | Ronstrom | ................... | 707/101 |
| 6,263,369 B1* | 7/2001 | Sitaraman et al. | ........... | 709/225 |
| 6,324,578 B1* | 11/2001 | Cox et al. | .................... | 709/223 |
| 6,463,474 B1* | 10/2002 | Fuh et al. | ..................... | 709/225 |
| 6,466,932 B1* | 10/2002 | Dennis et al. | .................. | 707/3 |
| 6,535,917 B1* | 3/2003 | Zamanzadeh et al. | ....... | 709/225 |
| 6,574,617 B1* | 6/2003 | Immerman et al. | ............. | 707/1 |
| 6,754,799 B2* | 6/2004 | Frank | ......................... | 711/216 |
| 7,062,780 B2* | 6/2006 | Leerssen et al. | ................ | 726/5 |
| 7,222,361 B2* | 5/2007 | Kemper | ......................... | 726/4 |
| 7,321,972 B2* | 1/2008 | Isaacson et al. | ............. | 713/189 |
| 7,350,075 B1* | 3/2008 | Eastham | ...................... | 713/168 |
| 2001/0044893 A1* | 11/2001 | Skemer | ...................... | 713/153 |
| 2003/0061087 A1* | 3/2003 | Srimuang | ...................... | 705/8 |
| 2005/0154913 A1* | 7/2005 | Barriga et al. | ............... | 713/201 |

* cited by examiner

*Primary Examiner*—Emmanuel L Moise
*Assistant Examiner*—Zachary A Davis
(74) *Attorney, Agent, or Firm*—Marger Johnson & McCollom, P.C.

(57) ABSTRACT

A computer receives an authentication request from a client. The computer creates a temporary user object and populates it with identification information from the authentication request. The computer then forwards the authentication request to an authentication source. Once the authentication source has validated the authentication request, the computer queries the authentication source for identification information, populates the temporary user object with the identification information, and makes the user object permanent.

25 Claims, 17 Drawing Sheets

AUTHENTICATION ON DEMAND IN A DISTRIBUTED NETWORK ENVIRONMENT

RELATED APPLICATION DATA

This application is related to U.S. patent application Ser. No. 10/061,911, titled "Authentication Cache in a Distributed Network Environment," filed Feb. 1, 2002.

FIELD OF THE INVENTION

This invention pertains to network access, and more particularly to automatically establishing local authentication information for users.

BACKGROUND OF THE INVENTION

The ability to access information over a network has been a boon to most users. That a user can access desired information from a remote location (possibly, even a location that the user could not locate or reach physically) has resulted in benefits to many.

But it remains important to be certain that the user accessing the resource is a legitimate user. To that end, users need to log in to the network and authenticate themselves. If they cannot identify themselves properly to the network, they are denied access to the network resources. This situation occurs when the Common Internet File System (CIFS) authentication is used, and is exemplified in the Network Attached Storage (NAS) architecture.

In many situations, the server to which the user connects is not the authentication source that actually authenticates the user. This adds a second level to the process, as the server must recognize the user before the user can even attempt authentication from the authentication source. For example, in FIG. 1 a user is logged in to client 105. Client 105 can be any type of computer system: desktop, laptop, thin client, dumb terminal, personal digital assistant (PDA), etc. Client 105 includes the appropriate components for its design. If client 105 is a desktop computer, client 105 includes a computer, monitor, keyboard, and mouse. The computer includes a central processing unit, memory, and other appropriate elements. Other components of client 105 can be present, such as a printer. A person skilled in the art will recognize other variations of client 105.

The user logs in to server 110 from client 105 via network 112. Network 112 can be any variety of network connection between client 105 and server 110. For example, network 112 can be a direct connection between client 105 and server 110, a wired network connection (such as Ethernet or token ring), a wireless connection (such as IEEE 802.11b, IEEE 802.11a, or Bluetooth), or any other type of connection. Server 110 verifies that the user is listed in user list 115, which is part of server 110. If the user is not listed in user list 115, then server 110 denies the user permission to proceed with logging in. Otherwise, the server forwards the authentication request to authentication source 120 over network connection 122. Network connection 122 can be any variety of network connection, just like network connection 112. Further, there is no requirement that network connections 112 and 122 be of the same type. Once authentication source 120 has received the authentication request, authentication source 120 can authenticate the user.

Observe that server 110 can deny the user permission to log in if the user is not listed in user list 115, even though the user is capable of authenticating himself to authentication source 120. Other than verifying that the user is in user list 115, server 110 merely acts as a conduit for authenticating the user. In technical terms, the authentication is performed as pass-through authentication. That is, the authentication communications between client 105 and authentication source 120 pass through server 110.

User list 115 can be implemented using Novell Directory Service, a component of versions of Novell Netware. When using Novell Directory Service, the user information is stored in user objects in user list 115.

In FIG. 1, a user John Smith is attempting to authenticate himself. Authentication request 130-1 is sent from client 105 to server 110. Server 110 checks to see that John Smith is in user list 115. Since John Smith is listed in user list 115 as entry 125, the server forwards authentication request 130-2 to authentication source 120. Authentication source 120 responds with challenge 135-1, which server 110 forwards challenge 135-2 to client 105. Challenge 135-1 and 135-2 is a randomly generated number, that both client 105 and authentication source 120 can hash to another value (called a credential), without revealing the user's (secret) password. If the credential generated by the client agrees with the credential generated by authentication source 120, then the user is authenticated.

Client 105 responds with credential 140-1, which server 110 forwards as credential 140-2 to authentication source 120. Once credential 140-2 is verified, authentication source 120 can validate the user. Authentication source 120 then sends back response 145-1, in this case indicating that the user has been successfully authenticated. Server 110 forwards response 145-2 to client 105, and client 105 is then allowed access to the resources offered by server 110.

There are two major problems with the authentication process described in FIG. 1. First, the user must have a user object in user list 115. If there is no user object for the user in user list 115, server 110 prohibits pass-through authentication, even if the user could authenticate himself to an authentication source. Currently, adding a user to user list 115 requires an administrator to insert the user into user list 115. This manual step is time consuming and error prone.

Second, even if the user is listed in user list 115 on server 110, if authentication source 120 is unavailable, the user cannot be authenticated. There are numerous reasons why authentication source 120 might be unavailable. For example, authentication source 120 might not be operating. Or network connection 122 might be down, even though authentication source 120 is operating. A person skilled in the art will recognize other ways in which authentication source 120 might be unavailable. And even though server 110 is technically capable of performing the authentication of the user, because authentication source 120 is unavailable, the user cannot be authenticated.

Accordingly, a need remains for a way to add users to a user list on the server without requiring manual insertion of the user data, and to allow the server to authenticate a user when the authentication source is unavailable, to address these and other problems associated with the prior art.

SUMMARY OF THE INVENTION

The invention is a method and apparatus for adding user information to a user list on a server. When a user logs into the server, the server creates a temporary user object and populates the user object with information received from the user. The authentication request is then forwarded to an authentication source. If the user is authenticated, the user object is made permanent. Otherwise, the user object is deleted.

The foregoing and other features, objects, and advantages of the invention will become more readily apparent from the following detailed description, which proceeds with reference to the accompanying drawings.

BRIEF DESCRIPTION OF THE DRAWINGS

FIGS. 1A-1D show a flowchart for storing authentication and cache control information on the server of FIG. 6, according to an embodiment of the invention.

DETAILED DESCRIPTION OF THE PREFERRED EMBODIMENT

Figure 2:
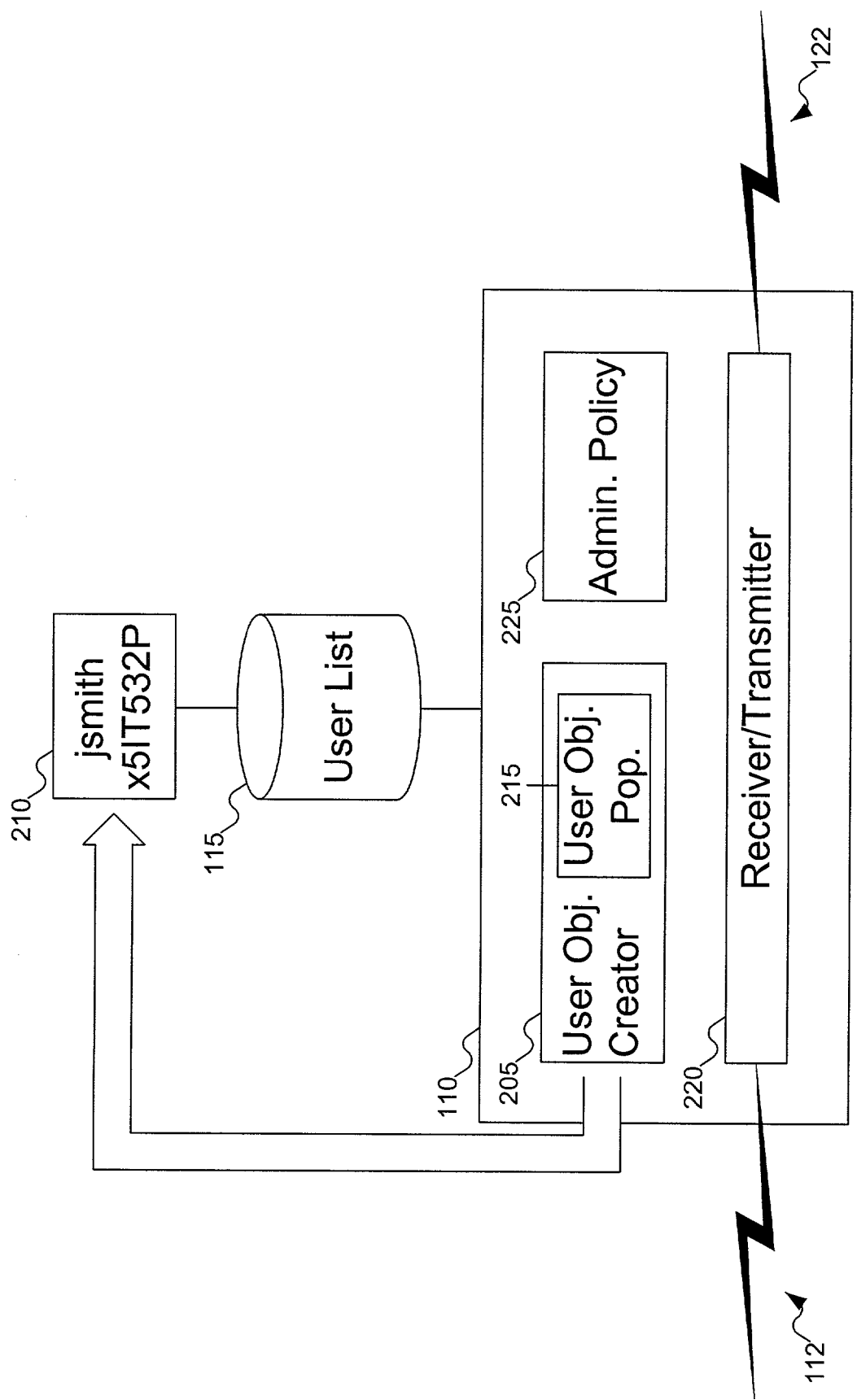
FIG. 2 shows a server configured to automatically insert user data into a user list on a server according to an embodiment of the invention.

FIG. 2 shows a server configured to automatically insert user data into a user list on a server according to an embodiment of the invention. In FIG. 2, server 110 is shown with only the components added to enable the invention. But a person skilled in the art will recognize that other components can be included or are not listed for reasons of simplicity in description. For example, server 110 is not shown as including a keyboard for administrator function, nor is a central processing unit or memory shown.

In FIG. 2, server 110 includes user object creator 205. User object creator 205 takes the identification information and creates a user object, such as user object 210, in user list 115.

Once created, the user object is populated with information by user object populator 215. For example, user object 210 is shown as including the username and encrypted password received from the client when the user logged in to server 110. But a person skilled in the art will recognize that other identification information can be stored, and that the identification information can come from the authentication source. For example, the authentication source can provide the user's full name (i.e., "John Smith"), which can be stored in user object 210.

Server 110 includes receiver/transmitter 220, which is responsible for handling communications with the client and authentication source. Receiver/transmitter 220 utilizes networks 112 and 122 to communicate with the client and authentication source to obtain the identification information stored in the user object. Also, as described above, receiver/transmitter 220 is used to facilitate the pass-through authentication of the user, and to enable the user to access resources from server 110.

Administration policy 225 is used to set policies for the creation of user objects. For example, administration policy 225 can limit file access rights for users with new user objects created in user list 115. The default rights established by administration policy 225 can be overridden by the administrator on a case-by-case basis.

One item of identification information that can be stored in the user object is the user's encrypted password. To protect passwords, when the user uses a client to log into a server, the client encrypts the password and transmits only the encrypted password. Although server 110 cannot decrypt the encrypted password (typically, passwords are encrypted for transmission using an irreversible function, i.e., hashed), the server can store the encrypted password in the user object. Then, when the user attempts to authenticate again at a later time, the encrypted password received from the client can be compared against the encrypted password stored in the user object. For example, if John Smith's password is "password," the encrypted password can be "x5IT532P." As shown in user object 210, the encrypted password is stored with John Smith's user name.

Figure 1:
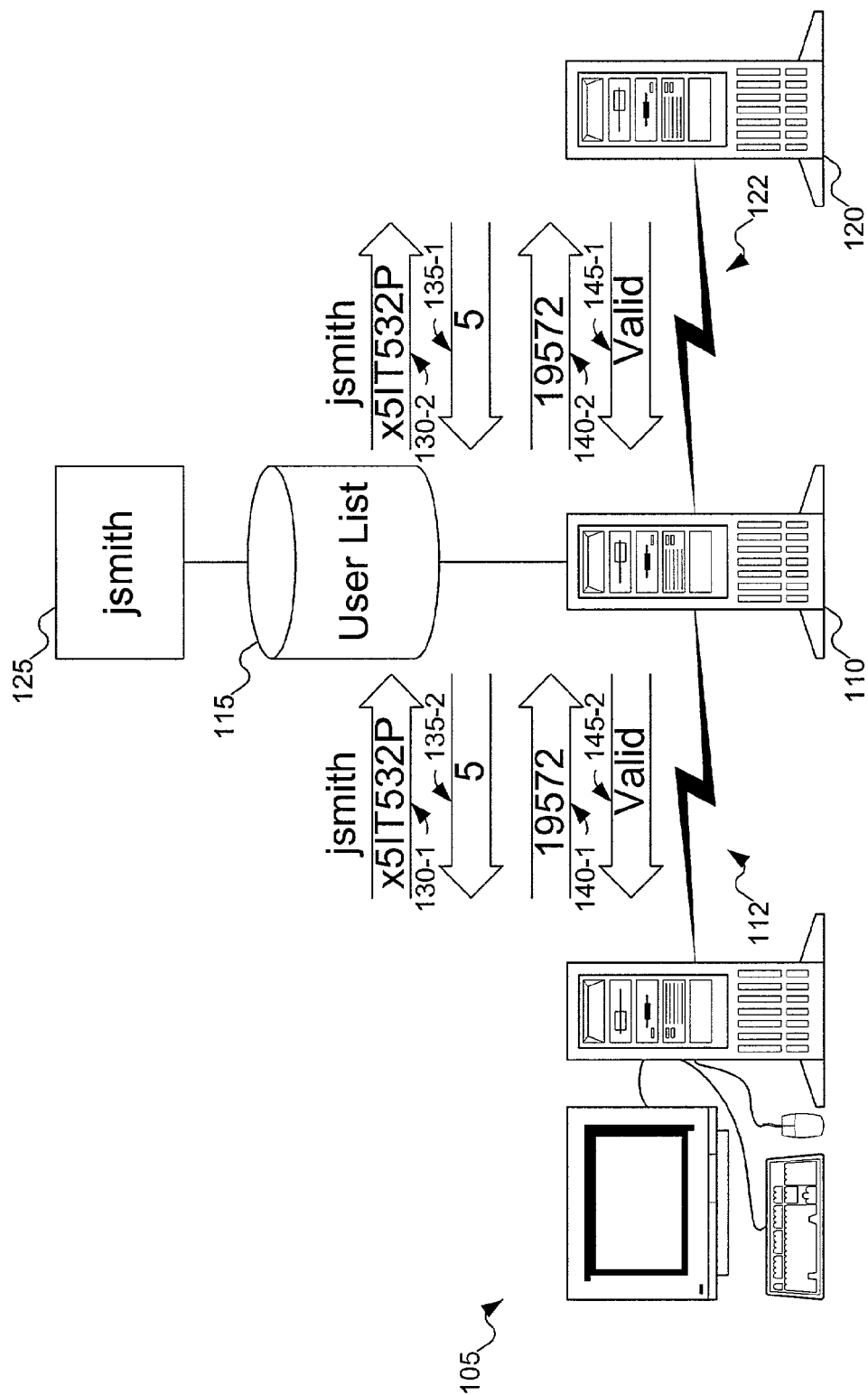
FIG. 1 shows a prior art system for authenticating a user.
Figure 3A:
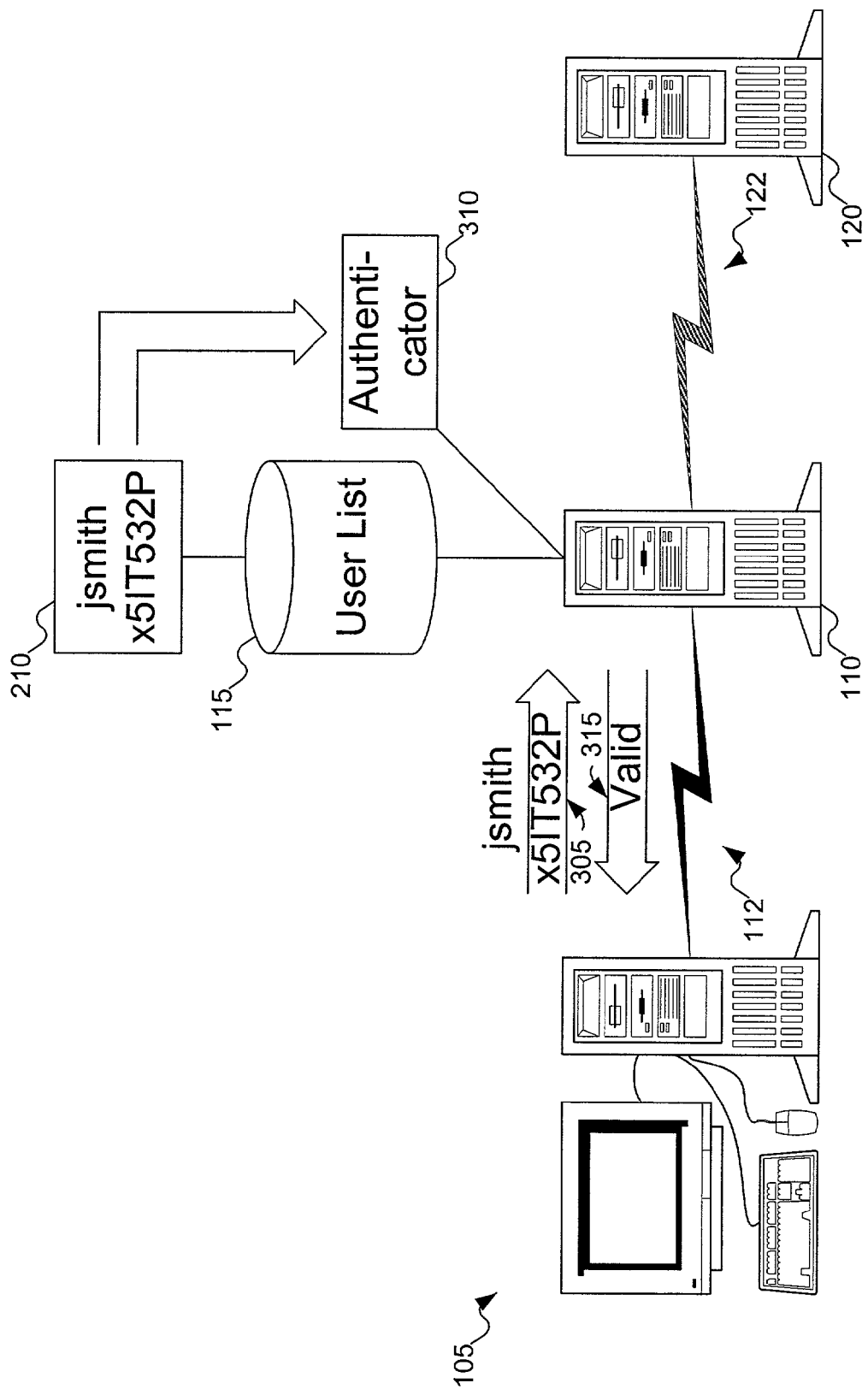
FIGS. 3A and 3B show the server of FIG. 2 used to attempt to authenticate a user without using the authentication source of FIG. 1.
Figure 3B:
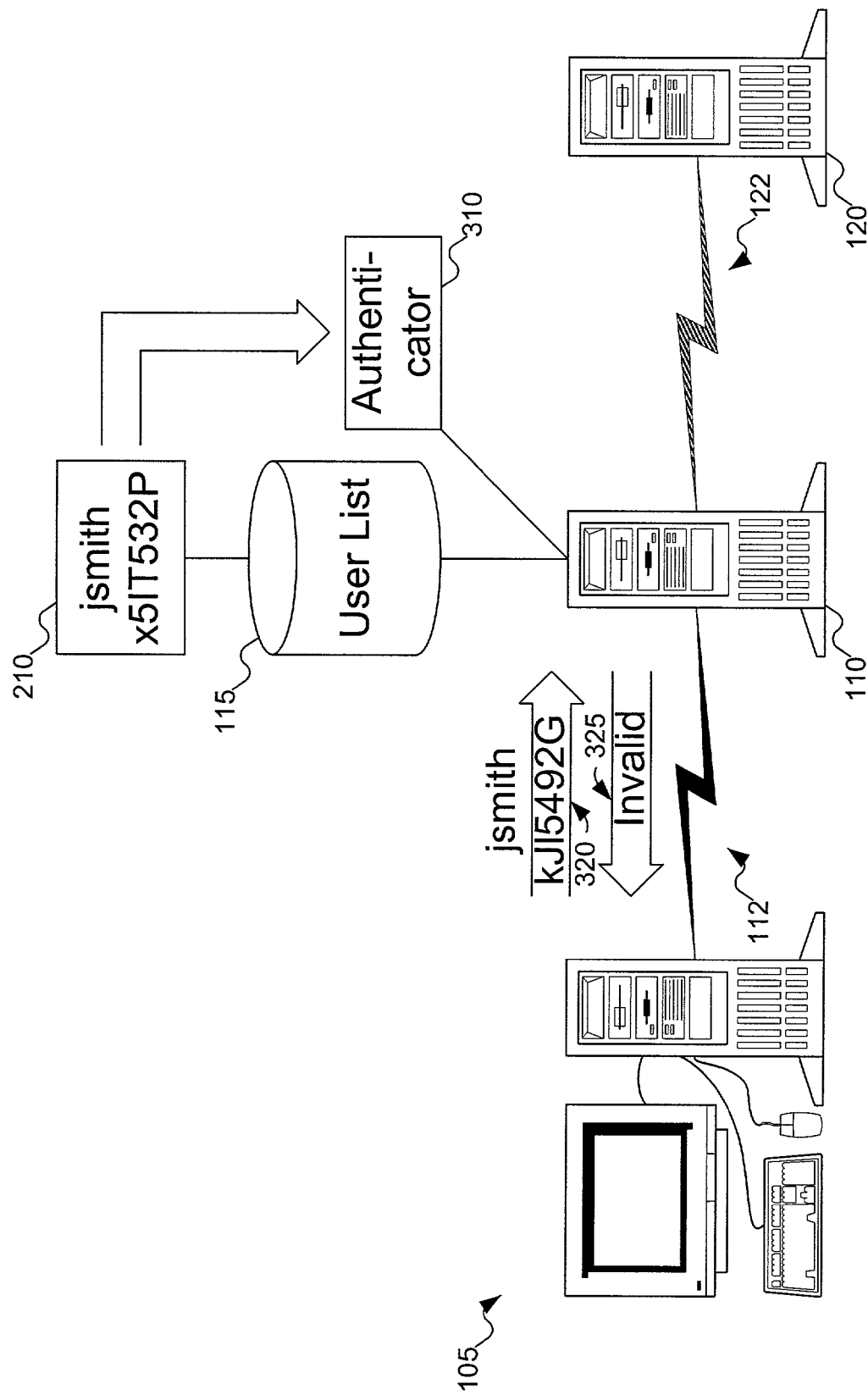

FIGS. 3A and 3B show the server of FIG. 2 used to attempt to authenticate a user without using the authentication source of FIG. 1. In FIG. 3A, user object 210 has been added to user list 115. When John Smith attempts to log in (and re-authenticate) at a later time, client 105 sends his user name and encrypted password, as shown in communication 305. Authenticator 310 compares the received user name and encrypted password with information in user list 115. When user object 210 is found, the user name and encrypted password in communication 305 are compared and determined to be a match. Server 110 can then respond with valid authentication communication 315. Observe that authentication source 120 was not accessed to authenticate the user in this situation (as shown by hashed network 122).

In contrast, in FIG. 3B, communication 320 from client 105 includes a different encrypted password for user John Smith. When authenticator 310 attempts to match the user name and password in communication 320 with user list 115, no match is found. Server 110 can then respond with invalid authentication communication 325, again without accessing authentication source 120. (Alternatively, because server 110 could not authenticate the user, server 110 can forward communication 320 to authentication source 120 and permit pass-through authentication as before. This might authenticate the user, even though the encrypted password in communication 320 differed from the encrypted password stored in user object 210.)

Note that in FIG. 3A, although server 110 was able to authenticate the user, it did so without issuing a challenge to and receiving a credential from client 105. This is because object 210, storing only an encrypted password, does not enable server 110 to verify the credential it would receive from client 105 in response to the challenge. This is why the communications between client 105 and server 110 are abbreviated.

Figure 4:
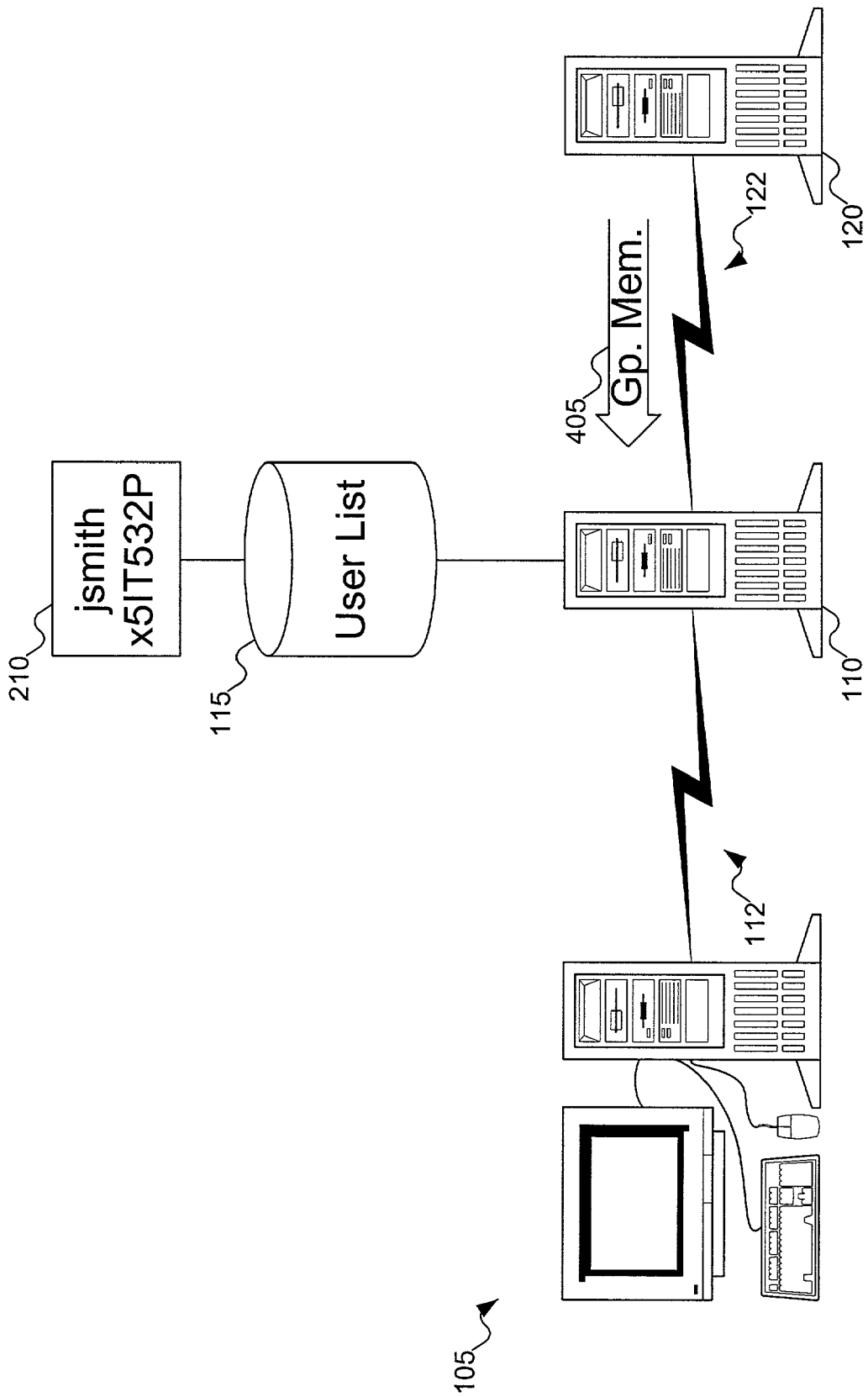
FIG. 4 shows the server of FIG. 2 receiving identification information about a user from the authentication source, according to an embodiment of the invention.

As discussed above with reference to FIG. 2, identification information can be received from the authentication source as well as from the client. FIG. 4 shows an example of this. In FIG. 4, the server of FIG. 2 is receiving identification information about a user from the authentication source. Specifically, server 110 is receiving group membership 405 for user object 210. (A person skilled in the art will recognize other types of identification information that can be received from the authentication source.) Group membership 405 can specify the container within user list 115 into which the new user object is to be placed.

Figure 5:
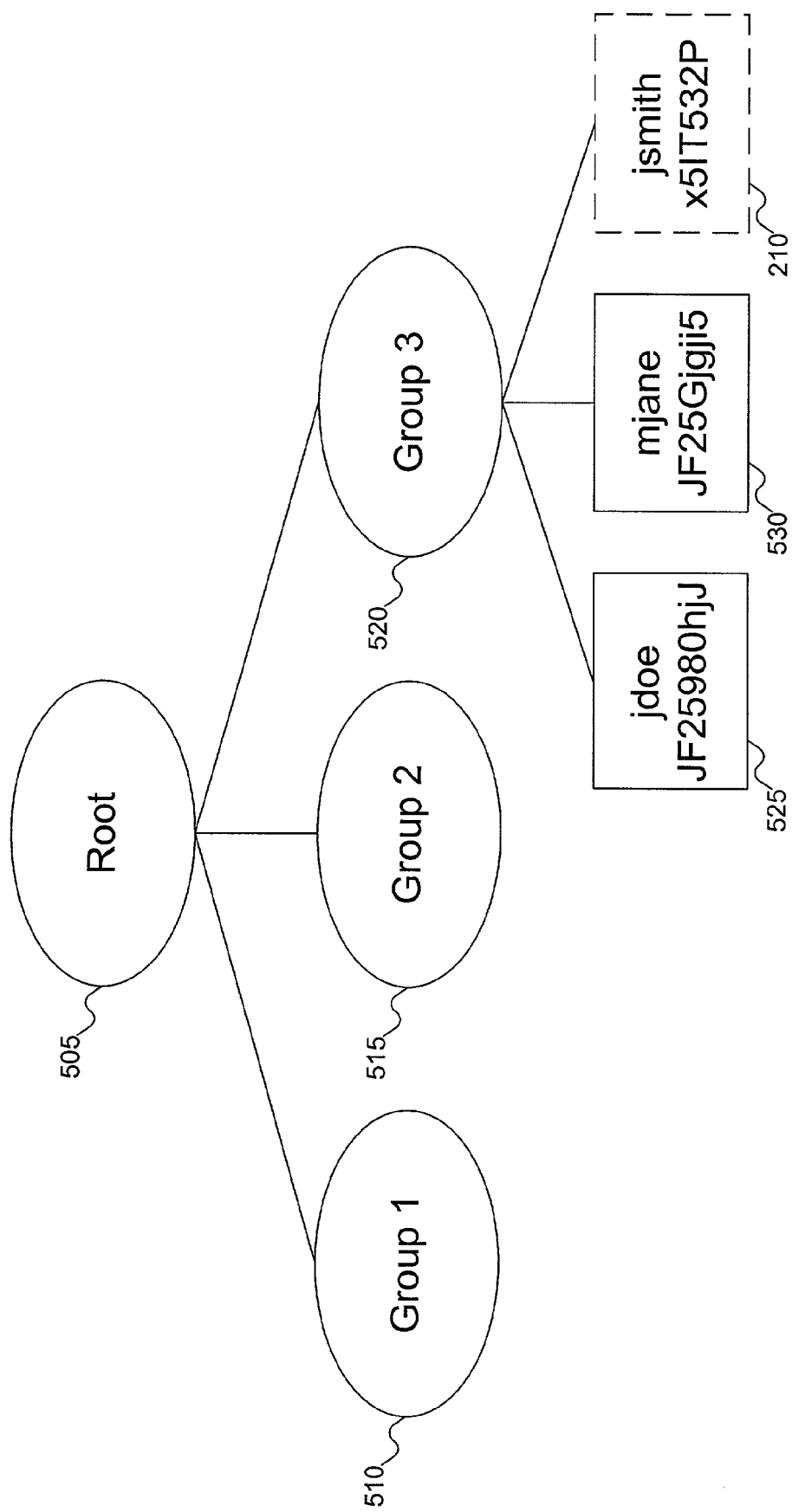
FIG. 5 shows a container hierarchy in the server of FIG. 2 into which identification information about a user is inserted based on the identification information received from the authentication source according to an embodiment of the invention, as shown in FIG. 4.

FIG. 5 shows a container hierarchy in the server of FIG. 2 into which identification information about a user is inserted based on the identification information received from the authentication source according to an embodiment of the invention, as shown in FIG. 4. In FIG. 5, root container 505 has three containers (510, 515, and 520). Within container 520 are two user objects (525 and 530). To this is added user object 210, as specified by group membership 405 of FIG. 4.

Figure 6:
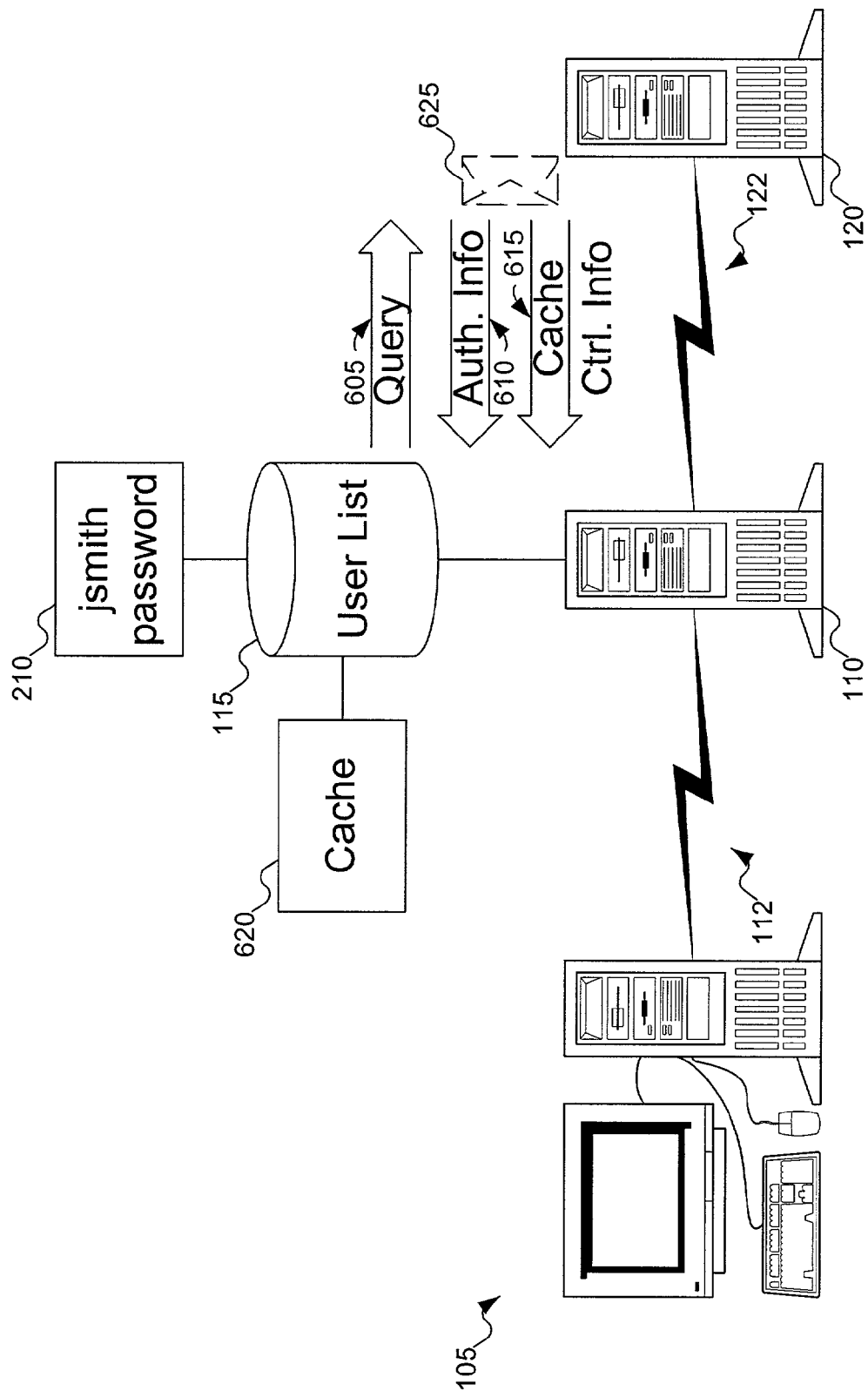
FIG. 6 shows the server of FIG. 2 receiving authentication and cache control information from the authentication source, according to an embodiment of the invention.

FIG. 6 shows the server of FIG. 2 receiving authentication and cache control information from the authentication source, according to an embodiment of the invention. In FIG. 6, server 110 sends query 605 to authentication source 120. Authentication source 120 responds by sending authentication information 610 and cache control information 615 to server 110. User object 210 is updated to store authentication information 610, such as an unencrypted password. Cache control information 615 is used to control the caching of authentication information 610, and is stored in cache 620. The type of cache control information can vary. For example, cache control information 615 can specify a duration for authentication information 610 (after which authentication information 610 is considered expired and will need to be retrieved again), a classification level for authentication information 610, an order policy specifying how server 110 is to use authentication information 610 (e.g., don't query authentication source 120 for authentication information 610 until authentication information 610 has expired), a policy on how to log authentications against authentication information 610, and whether and how password changes are permitted. A person skilled in the art will recognize other cache control information that can be selected.

Although authentication information 610 and cache control information 615 can be separate communications, they can be part of a single communication. For example, communication 625 (sometimes called a message or signal) can include both authentication information 610 and cache control information 615.

Authentication information 610 (and cache control information 615) is sensitive (the user's unencrypted password needs to be protected against unauthorized interception). To protect authentication information 610, preferably authentication source 120 encrypts the communication before transmitting it to server 110. Server 110 can then decrypt the information received from authentication source 120 and store the information in user list 115. But a person skilled in the art will recognize other ways in which authentication information 610 can be protected: for example, by securing network 122.

Figure 7:
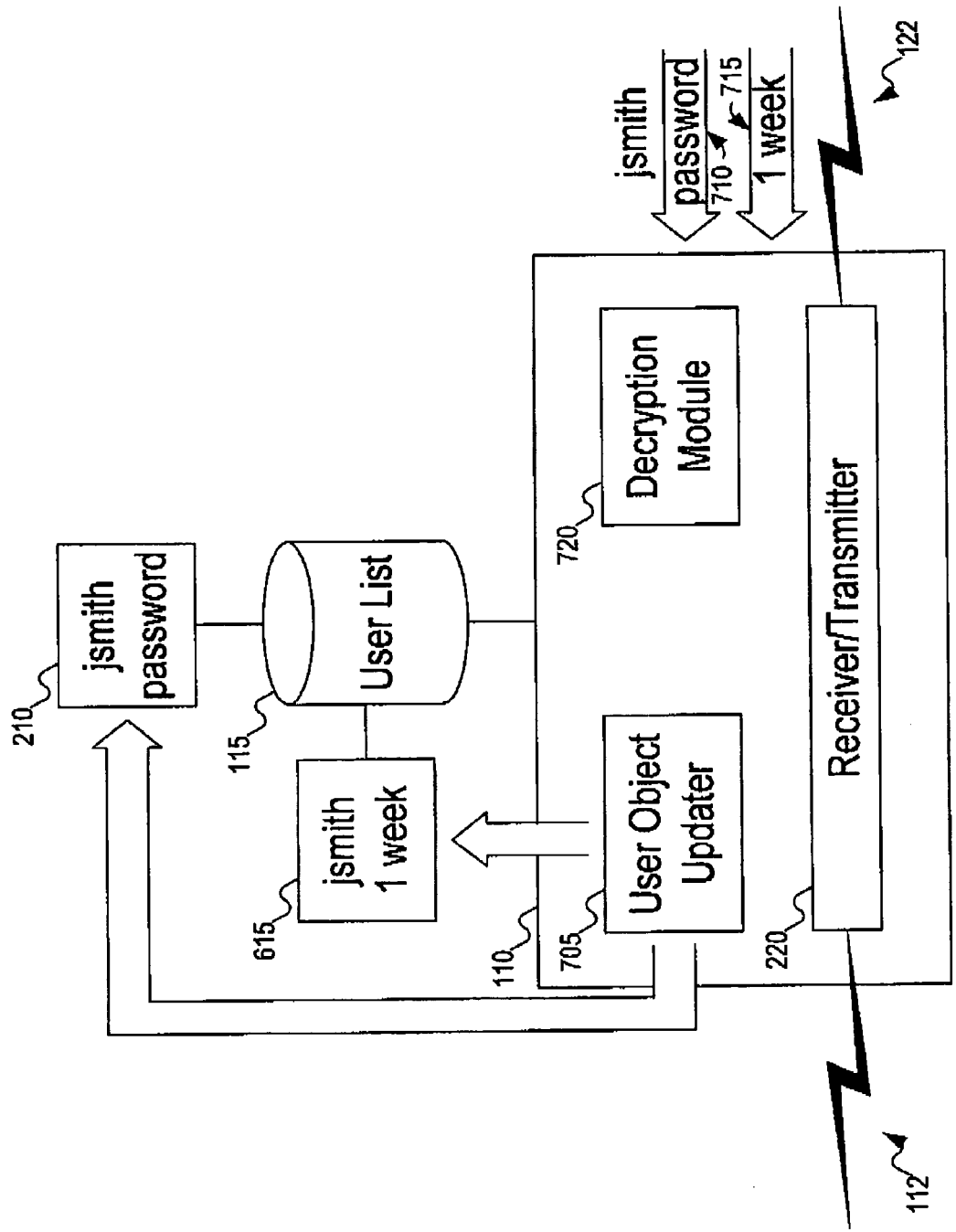
FIG. 7 shows the server of FIG. 2 storing the authentication and cache control information received from the authentication source as shown in FIG. 6, according to an embodiment of the invention.

FIG. 7 shows the server of FIG. 2 storing the authentication and cache control information received from the authentication source as shown in FIG. 6, according to an embodiment of the invention. In FIG. 7, server 110 includes user object updater 705. User object updater 705 updates the user object to store the authentication information received from the authentication source. For example, user object updater 705 updates user object 210 to store the (unencrypted) password "password" for user John Smith, as received in communication 710.

User object updater 705 also stores the cache control information received from the authentication source in cache 615. For example, server 110 has received cache control information 715 specifying that the password "password" for user John Smith is to be cached for one week, after which the password is expired. Thus, user object updater 705 stores the duration of "1 week" in cache 615

As mentioned above with reference to FIG. 6, the information received from the authentication source is preferably encrypted. Decryption module 720 is responsible for decrypting the information received from the authentication source, so that user object updater 705 can store the unencrypted information. Decryption module 720 can store the private key of a private/public key pair. The authentication source can then use the public key to encrypt information using a public key infrastructure.

Figure 8:
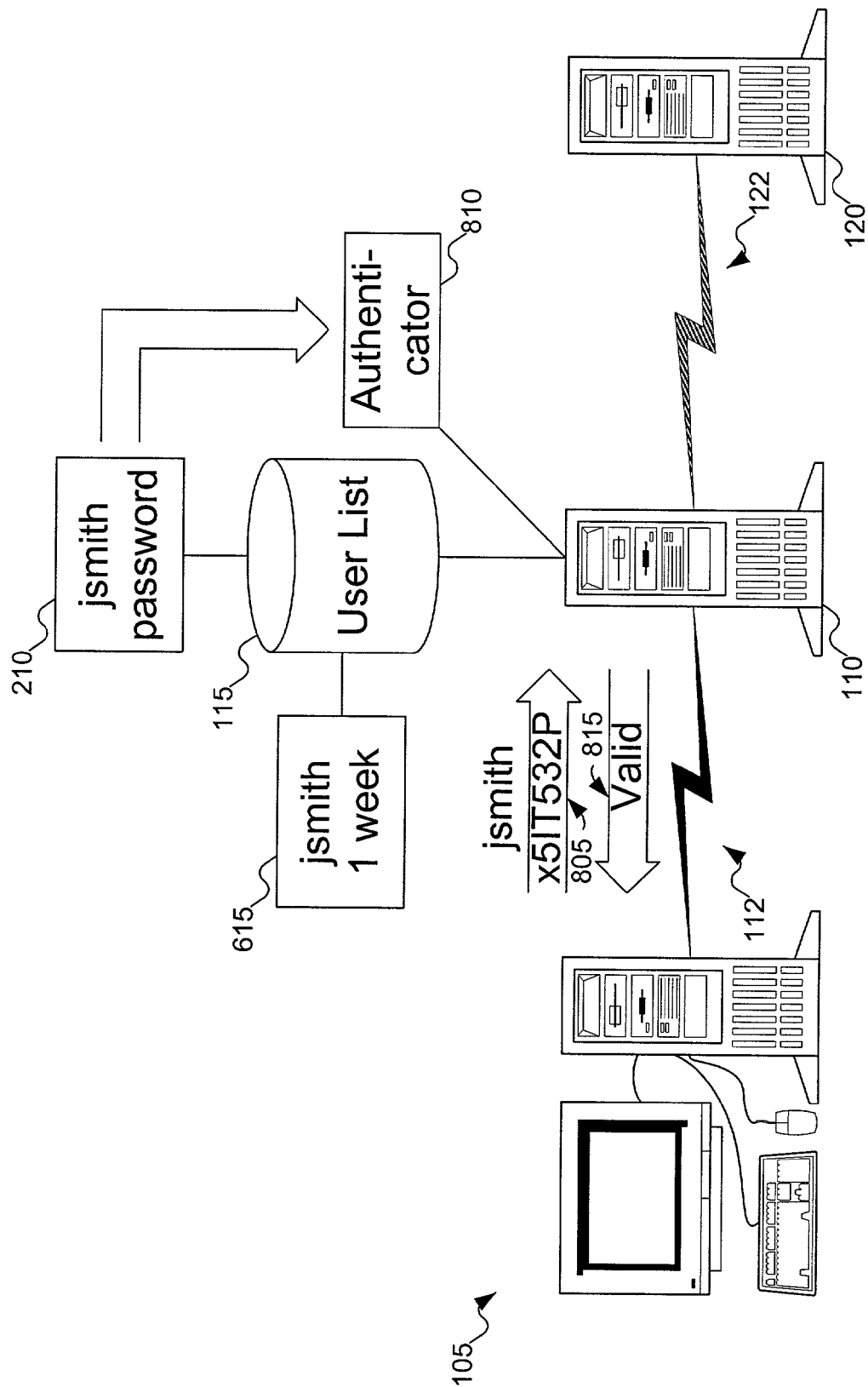
FIG. 8 shows the server of FIG. 6 authenticating an authentication request from a user without using the authentication source of FIG. 1.

FIG. 8 shows the server of FIG. 6 authenticating an authentication request from a user without using the authentication source of FIG. 1. In FIG. 8, client 105 sends the user name and encrypted password in communication 805 to server 110. Authenticator 810 in server 110 encrypts the unencrypted password stored in user object 210 and verifies that the password is correct. Server 110 responds with communication 815, informing client 105 that the user has been authenticated. (Although not shown in FIG. 8, server 110 can issue a challenge and require a credential from client 105, as described above with reference to FIG. 1.)

Although server 110 in FIG. 8 can authenticate the user without referring to authentication source 120, a person skilled in the art will recognize that server 110 can defer to authentication source 120, even though user object 210 is present and valid. It might happen that the user has changed passwords with authentication source 120 but server 110 has not been updated. In that case, server 110 would fail authentication request 805, even though client 105 has provided the correct encrypted password. Server 110 can also have an administrative policy of checking to see if authentication source 120 is available before authenticating based on the cache, and thereby act only as a back-up for authentication when authentication source 120 is unavailable.

As described above with reference to FIG. 3A, server 110 can authenticate the user without involving authentication source 120 (as shown by hashed network 122). But unlike FIG. 3A, because user object 210 stores the unencrypted password for the user, server 110 can issue the challenge and require the credential from client 105. (The server of FIG. 3A could not do this, because the credential is dependent on the unencrypted password, to which server 110 of FIG. 3A lacked access.) Thus, server 110 in FIG. 8 can be more certain about its authentication of the user.

Figure 9:
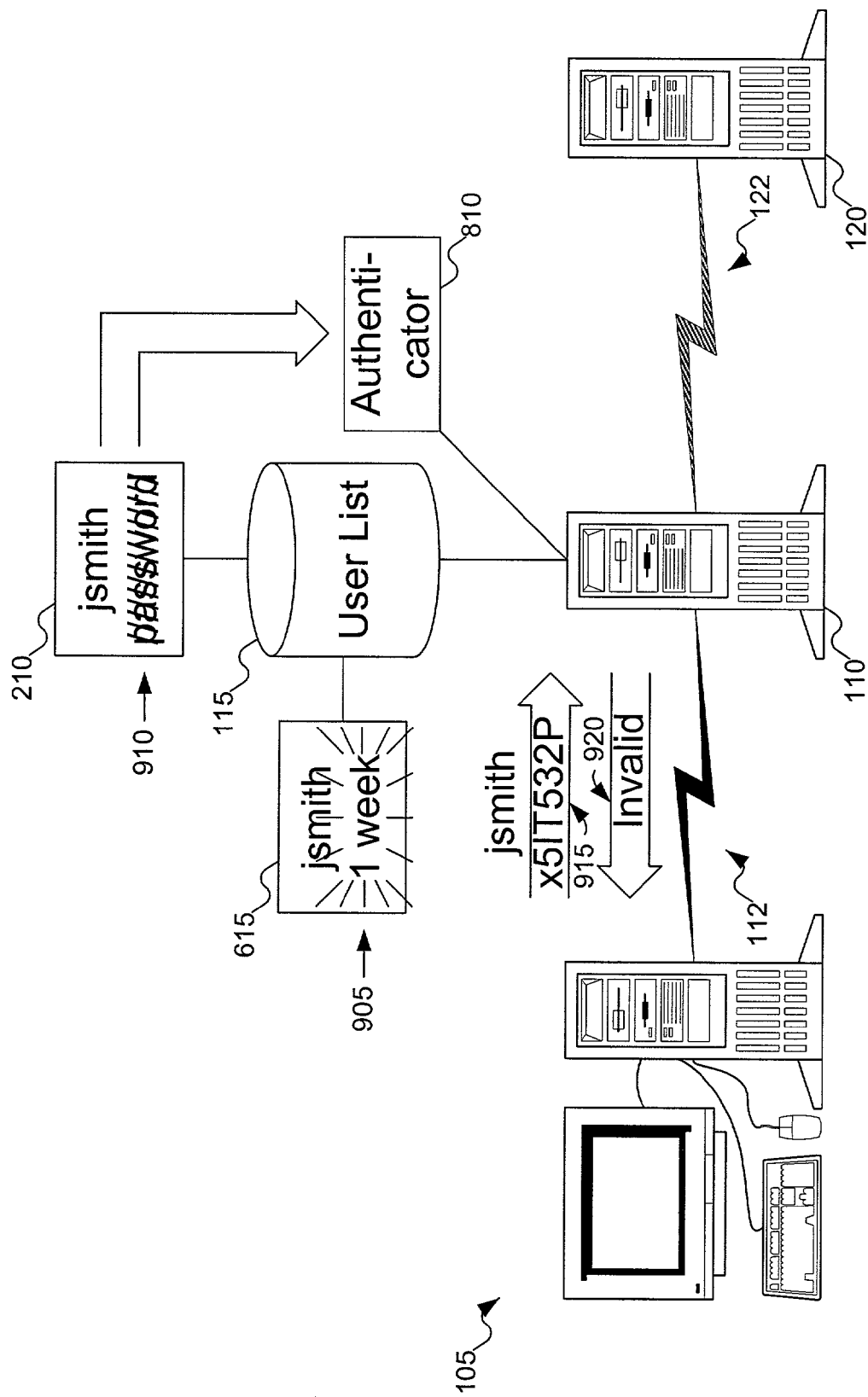
FIG. 9 shows the server of FIG. 6 using the cache control information to control the authentication information received from the authentication source according to an embodiment of the invention, as shown in FIG. 6.

FIG. 9 shows the server of FIG. 6 using the cache control information to control the authentication information received from the authentication source according to an embodiment of the invention, as shown in FIG. 6. In FIG. 9, the user has submitted the same user name/password combination as before, and the password is in fact correct for the user. However, in FIG. 9, the cache control information has been invoked. Assume in FIG. 9 that one week has passed (represented by the emphasis on cache 615 and indicated by arrow 905). Since enough time has elapsed to cause server 110 to expire the password stored in user object 210, the password in user object 210 has been erased (shown by arrow 910). As a result, when client 105 sends communication 915, even though the encrypted password is actually correct, because the cache control information in cache 615 has flushed the password from user object 210, server 110 is unable to authenticate the user. As a result, server 110 responds with communication 920, indicating that the user was not authenticated.

A person skilled in the will recognize that, although FIG. 9 did not show server 110 inquiring from authentication source 120 about the user's authentication request, other variations can permit this inquiry. For example, once server 110 has flushed the authentication information from user object 210, server 110 can pass authentication request 915 to authentication source 120 rather than failing the authentication request. Server 110 can then leave it to authentication source 120 to determine whether to validate or fail authentication request 915. And if authentication source 120 validates authentication request 915, server 110 can query authentication source 120 anew for the authentication and cache control information.

Figure 10A:
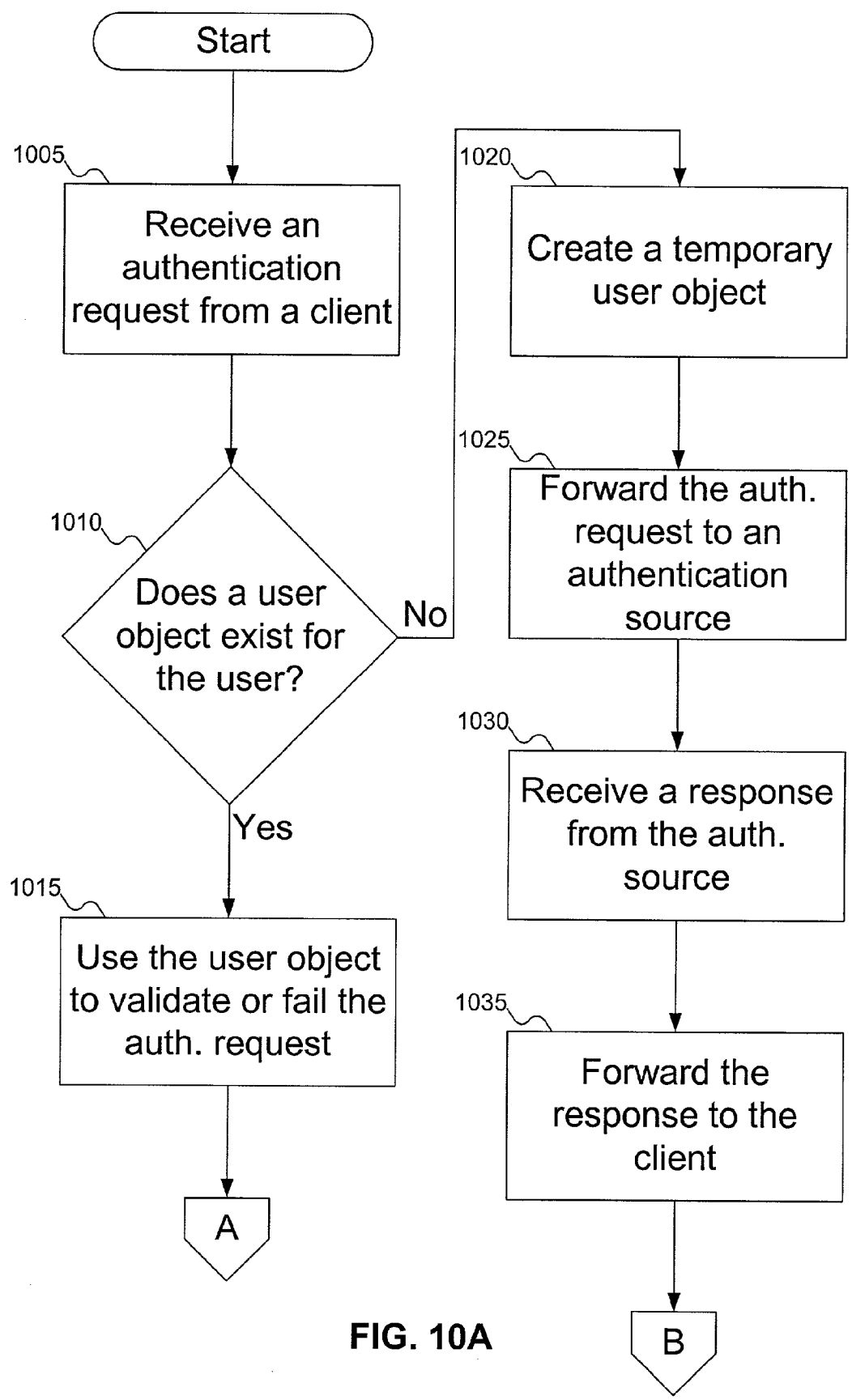
FIGS. 10A-10C show a flowchart for creating and populating a user object with identification information on the server of FIG. 2, according to an embodiment of the invention.
Figure 10B:
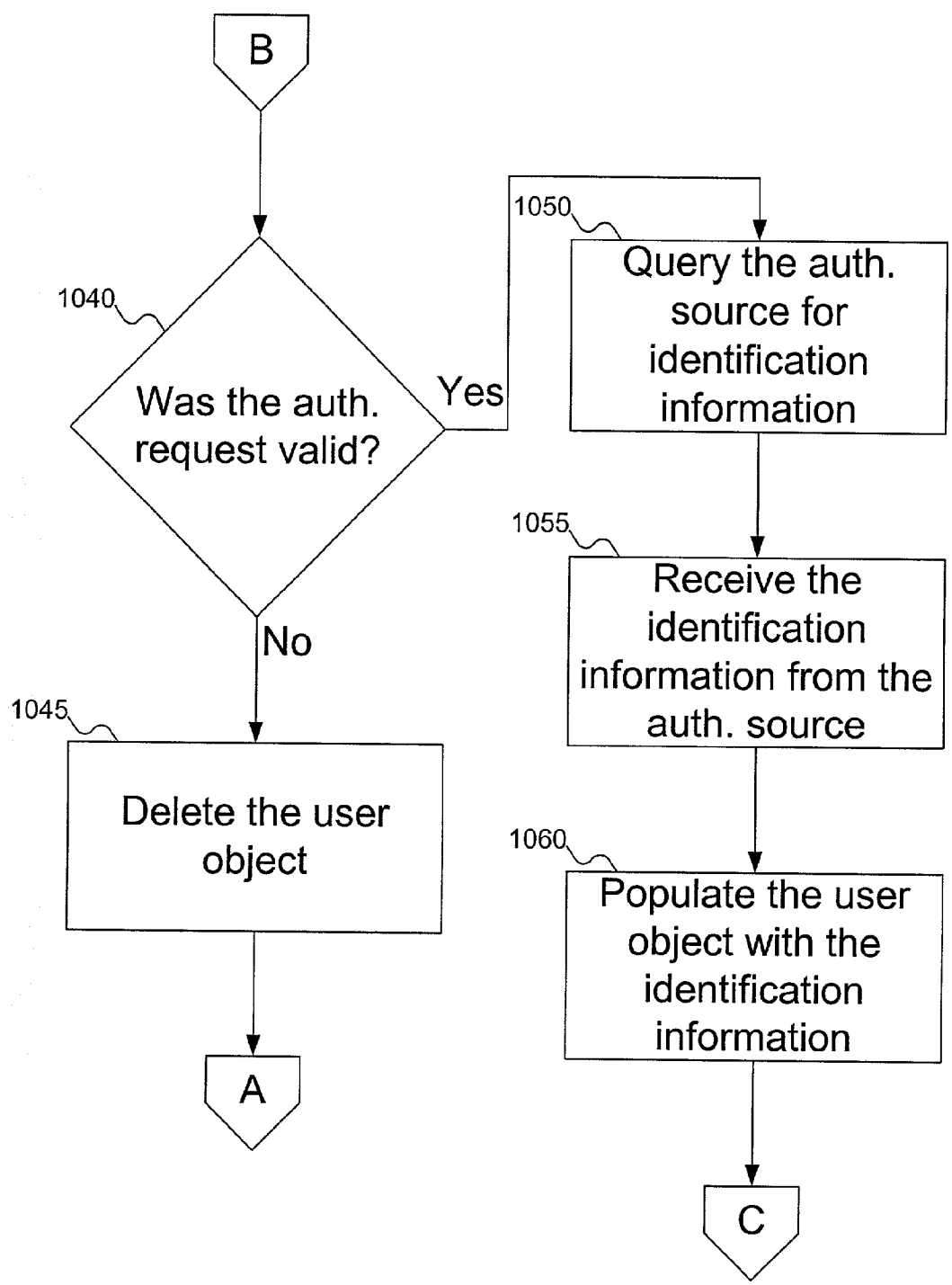
Figure 10C:
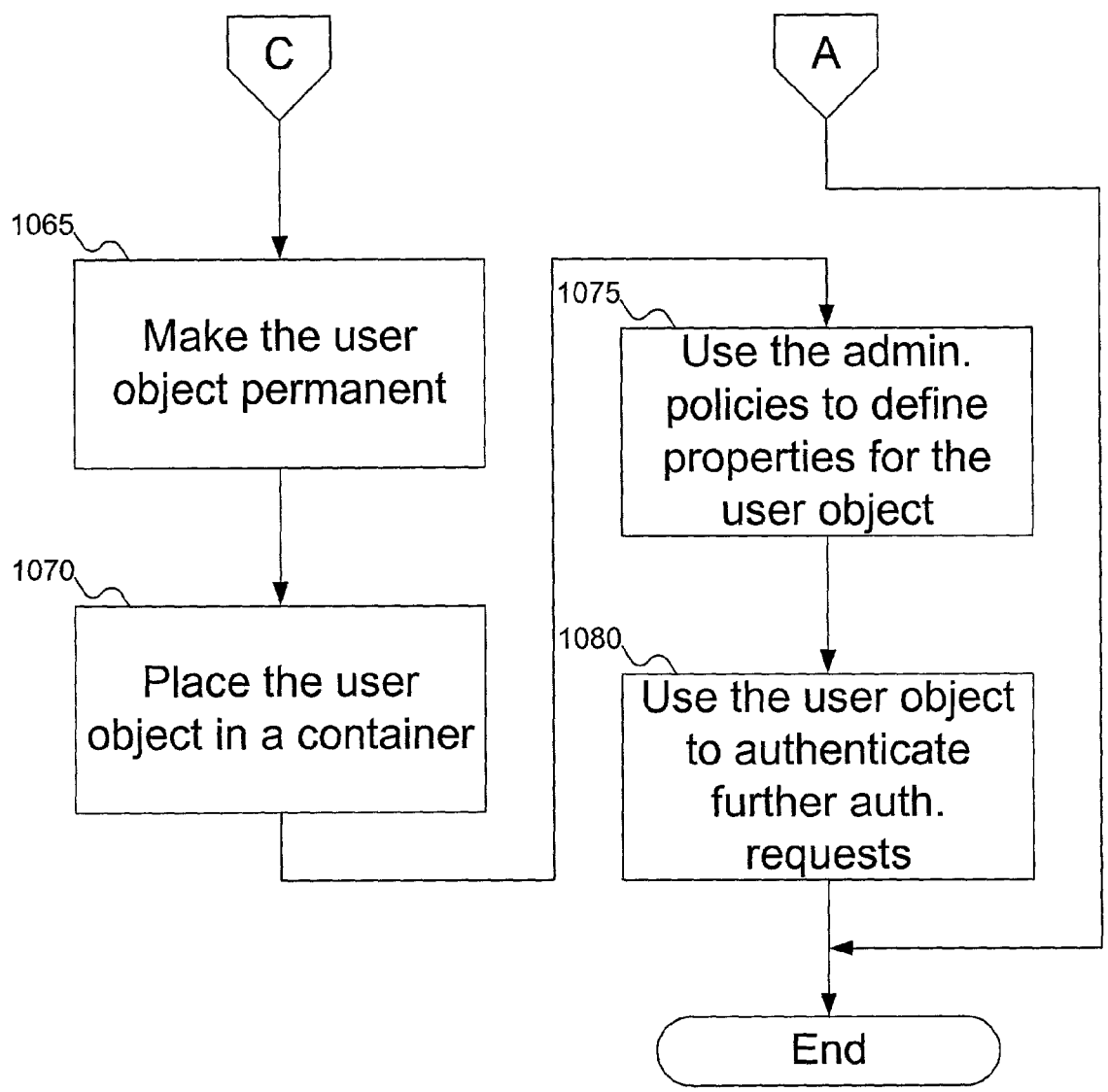

FIGS. 10A-10C show a flowchart for creating and populating a user object with identification information on the server of FIG. 2, according to an embodiment of the invention. In FIG. 10A, at step 1005, the computer receives an authentication request from a client. At step 1010, the computer checks to see if there is a user object that can satisfy the authentication request. If there is, then at step 1015 the computer uses the user object to validate or fail the authentication request.

If no user object exists, then at step 1020 the computer creates a temporary user object. At step 1025, the computer forwards the authentication request to an authentication source. At step 1030 the computer receives a response from the authentication source, which is forwarded at step 1035 to the client. Note that there can be multiple communications passing through the computer, as the authentication source issues a challenge and the client responds with a credential.

At step 1040 (FIG. 10B), the computer checks the response from the authentication source to see if the authentication request was validated or failed. If the authentication request was failed, then at step 1045 the computer deletes the temporary user object. Otherwise, at step 1050 the computer queries the authentication source for the identification information. At step 1055 the computer receives the identification information from the authentication source. At step 1060 the computer populates the user object with the identification information (see FIG. 2).

At step 1065 (FIG. 10C), the computer makes the user object permanent. At step 1070 the computer places the user object in a container (see FIG. 5). At step 1075, the computer uses administration policies to define properties for the user object. Finally, at step 1080, the computer can use the user object to authenticate further authentication requests.

Figure 11A:
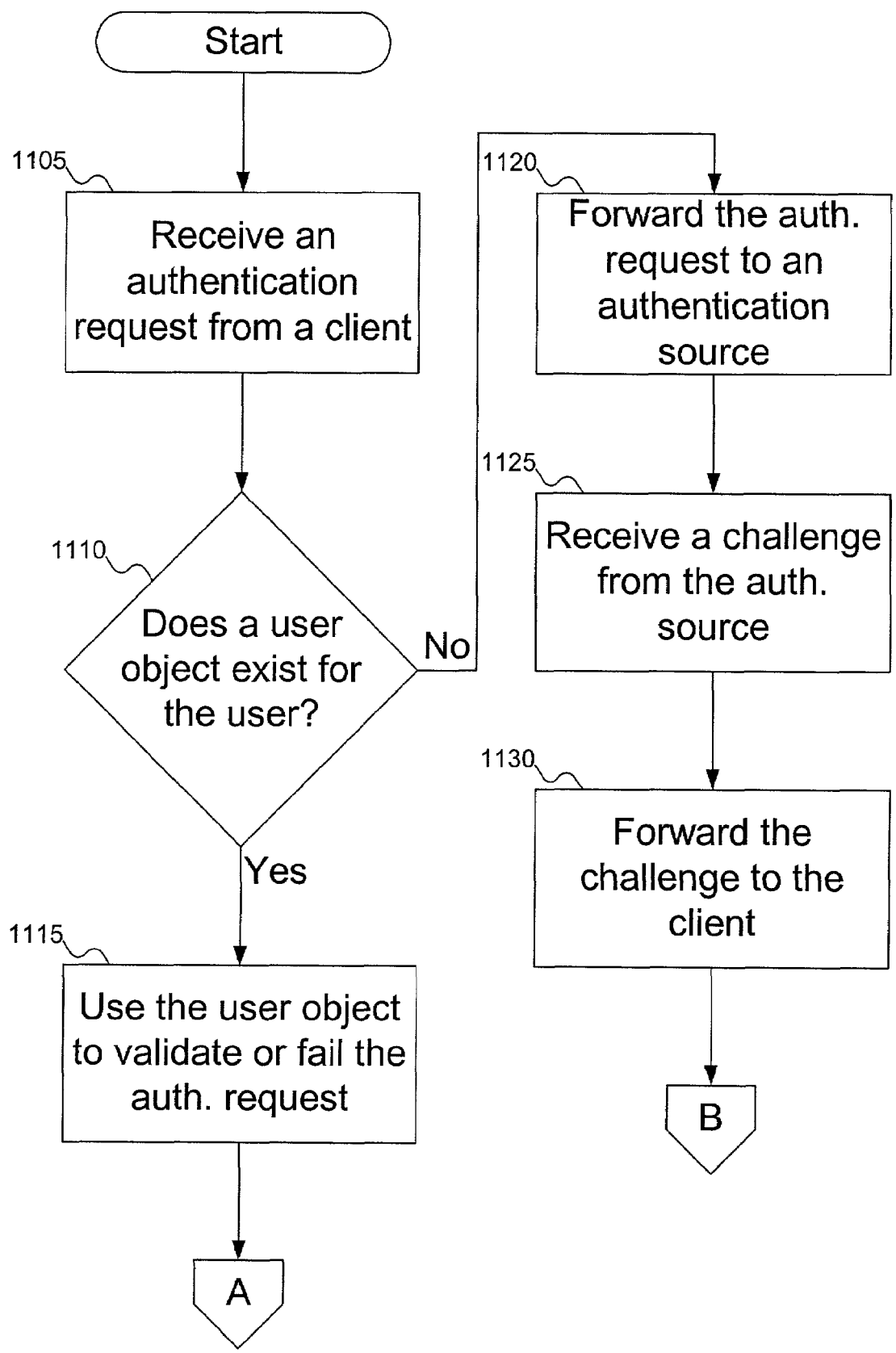
Figure 11B:
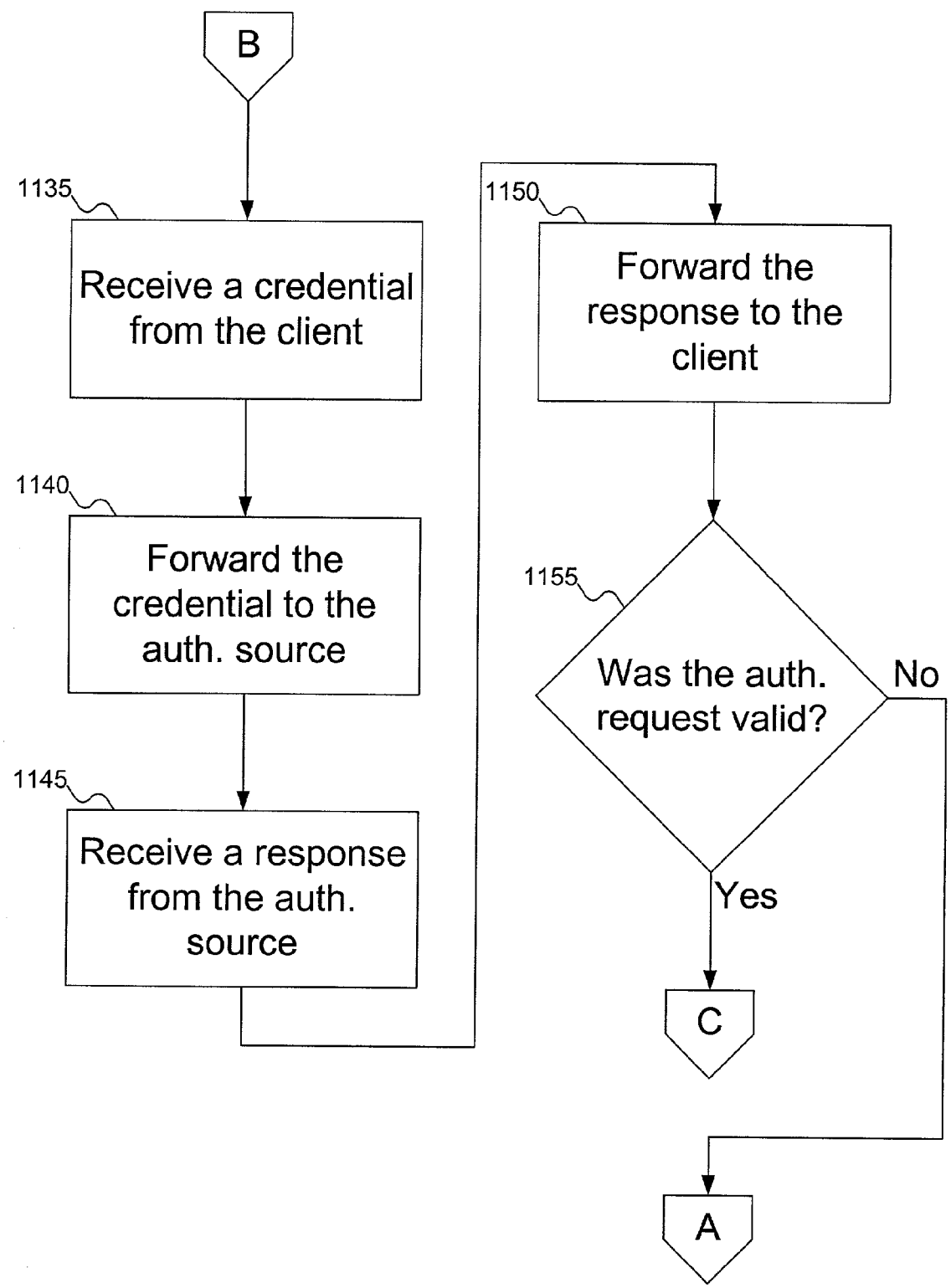
Figure 11C:
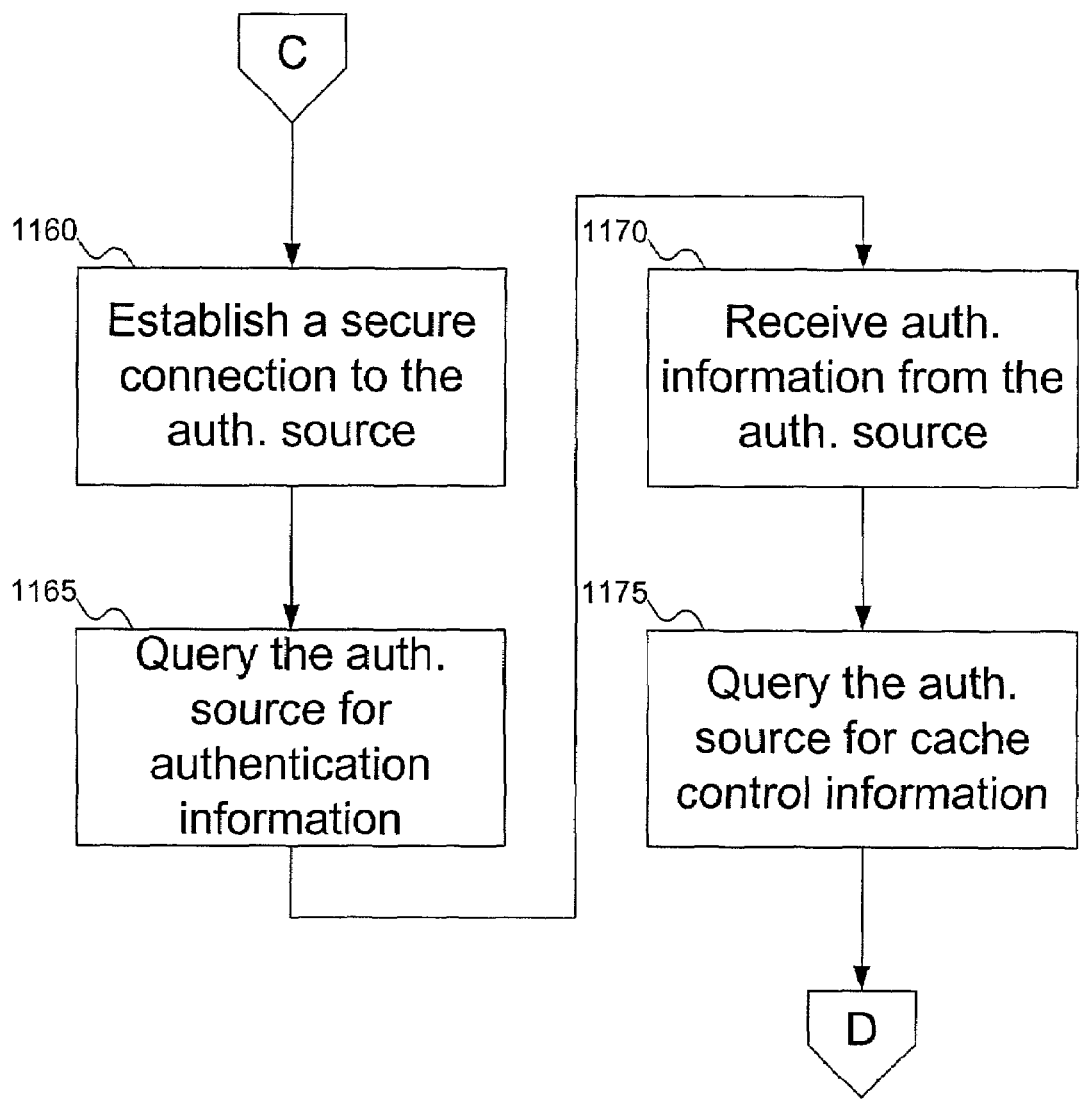
Figure 11D:
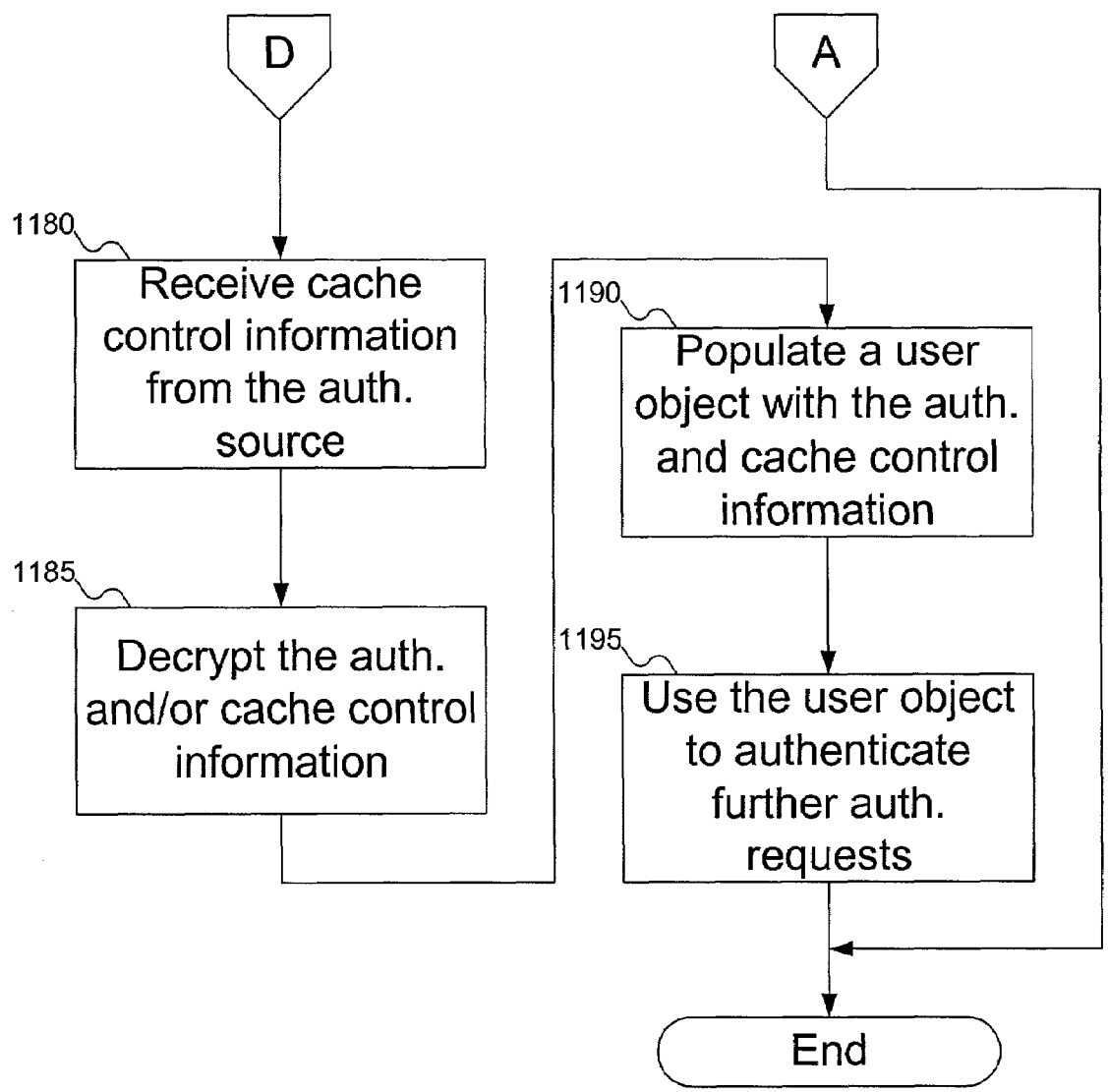

FIGS. 11A-11D show a flowchart for storing authentication and cache control information on the server of FIG. 6, according to an embodiment of the invention. In FIG. 11A, at step 1105, the computer receives an authentication request from the client. At step 1110, the computer checks to see if there is a user object that can satisfy the authentication request. If there is, then at step 1115 the computer uses the user object to validate or fail the authentication request (see FIG. 3A).

If no user object exists, then at step 1120 the computer forwards the authentication request to an authentication source. At step 1125 the computer receives a challenge from the authentication source, which the computer forwards to the client at step 1130.

At step 1135 (FIG. 11B), the computer receives a credential from the client, which the computer forwards to the authentication source at step 1140. At step 1145 the computer receives a response from the authentication source, which the computer forwards to the client at step 1150. At step 1155 the computer checks to see if the authentication request was validated or failed by the authentication source. If the authentication source failed the authentication request, then the computer has finished its processing.

But if the authentication source validated the authentication request, then at step 1160 (FIG. 11C) the computer establishes a secure connection to the authentication source. At step 1165 the computer queries the authentication source for the authentication information. At step 1170 the computer receives the authentication information from the authentication source. At step 1175 the computer queries the authentication source for the cache control information.

At step 1180 (FIG. 11D), the computer receives the cache control information from the authentication source. (At this point, the secure connection between the computer and the authentication source can be released.) At step 1185 the computer decrypts the authentication and cache control information. At step 1190 the computer populates the user object with the authentication information and cache control information. Finally, at step 1195, the computer can authenticate further authentication requests based on the user object (at least until the cache control information expires the authentication information).

The embodiments of the invention as described above can be implemented using instructions. These instructions, which when executed in an appropriate order produce a program, can be stored on a computer-readable medium (such as random access memory within a computer, removable media like floppy disks or compact discs, fixed media such as hard disks, and the like) and executed as needed.

Having illustrated and described the principles of the invention in a preferred embodiment thereof, it should be readily apparent to those skilled in the art that the invention can be modified in arrangement and detail without departing from such principles. All modifications coming within the spirit and scope of the accompanying claims are claimed.

The invention claimed is:

1. An apparatus to establish local authentication information, comprising:
   a computer;
   a memory in the computer, the memory including a container hierarchy, the container hierarchy including a first container and a second container stored in the first container;
   a user object creator for creating a user object for storage in the second container in the container hierarchy;
   an authentication source to authenticate a first authentication request;
   a user object populator for populating the user object with identity information including a user name and an encrypted password responsive to the first authentication request, wherein the user object populator is operative to make the user object permanent responsive to a signal from the authentication source indicating a validated authentication request; and
   a local administration policy for the computer to define rights for the user object independent of rights of a corresponding user object in the authentication source.

2. An apparatus according to claim 1, wherein the user object populator is operative to delete the user object responsive to a signal from the authentication source indicating a failed authentication request.

3. An apparatus according to claim 1, further comprising an authenticator for authenticating a second authentication request received by the computer, using the user object independently of the authentication source.

4. A method for establishing local authentication information for a user, comprising:
- receiving a first authentication request from a client, the first authentication request including a user name and an encrypted password;
- forwarding the first authentication request to an authentication source;
- receiving a response from the authentication source;
- forwarding the response to the client;
- creating a user object for the user;
- placing the user object in a container, the container residing in a container hierarchy;
- populating the user object with identification information about the user, the identification information including the user name and the encrypted password;
- making the user object permanent if the response from the authentication source validates the first authentication request; and
- applying a local administration policy defining rights for the user object independent of rights for a corresponding user object in the authentication source.

5. A method according to claim 4, further comprising responding to a second authentication request from the user based on the user object.

6. A method according to claim 4, further comprising deleting the user object if the response from the authentication source fails the first authentication request.

7. A method according to claim 4, wherein populating the user object includes assigning a group membership to the user object.

8. A method according to claim 4, wherein receiving a response includes receiving the identification information from the authentication source.

9. A method according to claim 8, wherein receiving the identification information includes querying the authentication source for the identification information.

10. A method according to claim 4, wherein creating a user object for the user includes creating the user object for the user responsive to the response to the first authentication request.

11. One or more computer-readable media containing a program to establish local authentication information for a user, comprising:
- software to receive a first authentication request from a client, the first authentication request including a user name and an encrypted password;
- software to forward the first authentication request to an authentication source;
- software to receive a response from the authentication source;
- software to forward the response to the client;
- software to create a user object for the user;
- software to place the user object in a container, the container residing in a container hierarchy;
- software to populate the user object with identification information about the user including the user name and the encrypted password;
- software to make the user object permanent if the response from the authentication source validates the first authentication request; and
- software to apply a local administration policy defining rights for the user object independent of rights of a corresponding user object in the authentication source.

12. One or more computer-readable media containing a program according to claim 11, further comprising software to respond to a second authentication request from the user based on the user object.

13. One or more computer-readable media containing a program according to claim 11, wherein the software to create the user object includes software to create the user object for the user responsive to the response to the first authentication request.

14. One or more computer-readable media containing a program according to claim 11, further comprising software to delete the user object if the response from the authentication source indicates that the first authentication request failed.

15. A system comprising:
- a first computer;
- memory in the first computer, the memory including a container hierarchy, the container hierarchy including a first container and a second container stored in the first container;
- a second computer in communication with the first computer for generating an authentication request;
- an authentication source in communication with the first computer for responding to the authentication request from the second computer;
- means for populating a user object stored in the second container in the container hierarchy with identification information including a user name and an encrypted password;
- means for making the user object permanent responsive to a signal from the authentication source indicating a validated authentication request; and
- a local administration policy to define rights for the user object independent of rights of a corresponding user object in the authentication source.

16. A system according to claim 15, wherein the means for populating a user object includes means for determining the identification information from the authentication source.

17. A system according to claim 15, wherein the means for populating a user object includes means for determining the identification information from the authentication request.

18. A system according to claim 15, further comprising means for deleting the user object responsive to a signal from the authentication source indicating a failed authentication request.

19. A method for establishing local authentication information for a user, comprising:
- receiving a first authentication request from a client, the first authentication request including a user name and an encrypted password;
- creating a temporary user object for the user;
- placing the temporary user object in a container, the container residing in a container hierarchy;
- forwarding the first authentication request to an authentication source;
- receiving a response from the authentication source;
- if the response from the authentication source indicates that the first authentication request succeeded:
  - populating the temporary user object with identification information including the user name and the encrypted password;
  - marking the temporary user object as permanent; and
  - returning to the client a code validating the first authentication request.

20. A method according to claim 19, further comprising:
- if the response from the authentication source indicates that the first authentication request failed:

deleting the temporary user object; and returning to the client a code failing the first authentication request.

21. A method according to claim 19, further comprising:

receiving a second authentication request from the client; and validating or failing the second authentication request based on the permanent user object.

22. A method according to claim 19, further comprising applying a local administration policy defining rights for the user object independent of rights in a corresponding user object in the authentication source.

23. One or more computer-readable media containing a program to store identification information, comprising:

software for creating a user object;

software for placing the user object in a first container, the first container residing in a second container, the second container residing in a container hierarchy;

software to receive a message containing the identification information including a user name and an encrypted password;

software for populating the user object with the identification information including the user name and the encrypted password drawn from the message;

software for making the user object permanent if a response from an authentication source validates a first authentication request; and software for applying a local administration policy defining rights for the user object independent of rights of a corresponding user object in the authentication source.

24. One or more computer-readable media containing a program according to claim 23, further comprising software for defining properties for the user object.

25. One or more computer-readable media containing a program according to claim 23, further comprising software for deleting the user object if the response from the authentication source fails the first authentication request.

* * * * *

UNITED STATES PATENT AND TRADEMARK OFFICE
CERTIFICATE OF CORRECTION

| | | |
|---|---|---|
| PATENT NO. | : 7,487,535 B1 | Page 1 of 1 |
| APPLICATION NO. | : 10/061895 | |
| DATED | : February 3, 2009 | |
| INVENTOR(S) | : Isaacson et al. | |

It is certified that error appears in the above-identified patent and that said Letters Patent is hereby corrected as shown below:

Column 3, line 42, the words "FIGS. 1A-1D" should read -- FIGS. 11A-11D --.

Signed and Sealed this

Thirtieth Day of June, 2009

JOHN DOLL
*Acting Director of the United States Patent and Trademark Office*